March 16, 1943.　　　A. L. RUSSELL　　　2,313,892
BONDING BY ADHESIVE
Filed Sept. 8, 1941
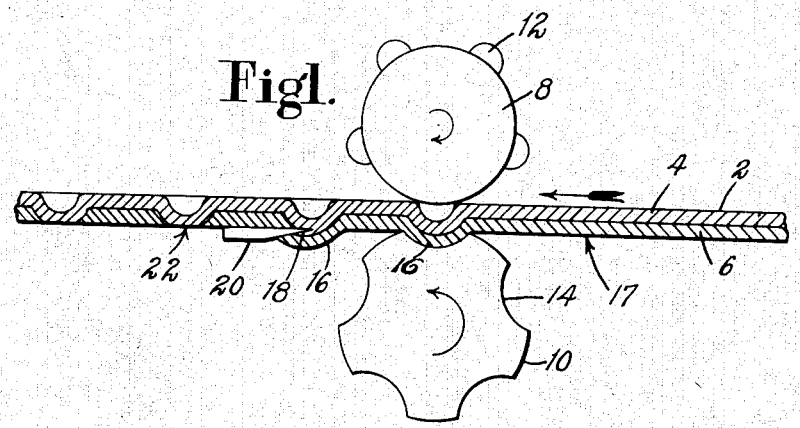
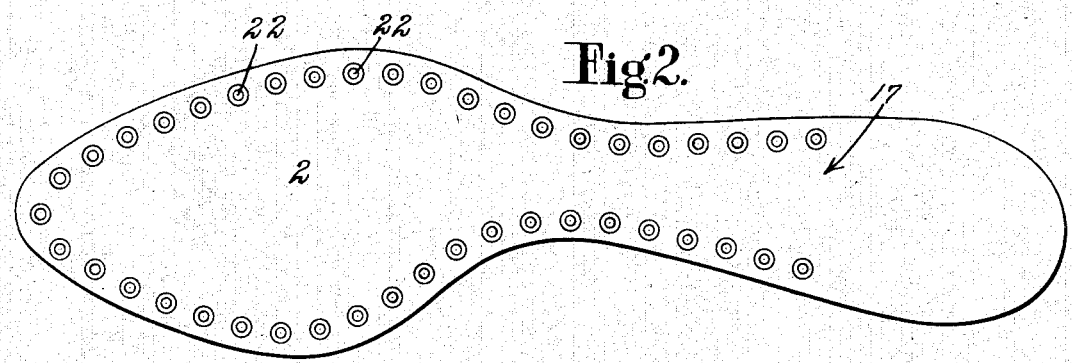
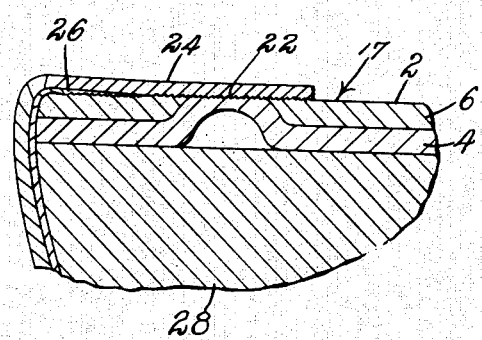
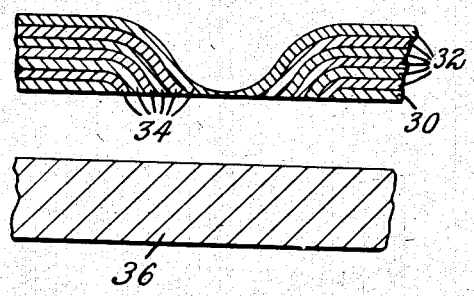
INVENTOR
Arthur L. Russell
By his attorney Patented Mar. 16, 1943

2,313,892

UNITED STATES PATENT OFFICE 2,313,892

BONDING BY ADHESIVE

Arthur L. Russell, Boston, Mass., assignor to United Shoe Machinery Corporation, Flemington, N. J., a corporation of New Jersey Application September 8, 1941, Serial No. 409,993

8 Claims. (Cl. 12—145)

This invention relates to methods of bonding two pieces of material by adhesive. The invention relates also to methods of preparing sheet material for bonding, and to sheet material which has been prepared for bonding according to these methods.

In the past, considerable difficulty has been experienced in bonding some pieces of sheet material due to the fact that the bond produced by the usual method between the surfaces of two pieces of stock is stronger than that between such surfaces and subjacent portions of the two pieces of stock. Thus, a satisfactorily strong bond between the surfaces of two pieces of sheet material may be of little utility due to the fact that these surfaces tear away from the subjacent portions of the sheet material whenever shearing or tearing forces are applied to the bond. This difficulty is particularly noticeable when one of the pieces of the sheet material consists of a plurality of laminae joined together by a suitable binder. Such sheet material may, for example, consist of a number of laminae of a wood-pulp base composition secured together by latex.

It is an object of the present invention, therefore, to overcome such difficulties as above referred to and to provide a method of forming an improved bond between two pieces of material, the bond extending to subjacent parts of the material thereby to prevent separation of the material itself.

It is a further object of this invention to provide sheet material having improved bonding characteristics such that the bond between it and another piece will extend to subjacent parts of the material, as above referred to, and to provide a method of preparing such sheet material.

In accordance with these objects, my invention provides in one aspect a method of bonding two pieces of material which includes forming a plurality of protuberances on a surface of one of the two pieces of material, skiving off or otherwise removing the protuberances to expose subjacent stock in different areas over the surface, applying adhesive to the surface of the material including the areas thus exposed, and bringing together the piece and a second piece to which it is to be bonded. In the event that one of the pieces of sheet material already has protuberances formed thereon, the method includes the steps of removing the protuberances, applying adhesive to the surface of the material and to the areas exposed by removing the protuberances, and bringing together the piece and the second piece to which it is to be bonded.

In another aspect, the invention provides a laminated insole blank comprising an outer lamina having openings disposed along the margin thereof and at least one subjacent lamina portions of which extend through the openings in said outer lamina and are exposed to view on the surface thereof. The invention is also charaterized by a novel method of preparing such an insole.

In still another aspect, the invention provides laminated sheet material comprising an outer lamina having openings scattered over its surface, and a plurality of subjacent laminae portions of which extend through openings in said outer laminae and are exposed to view on the surface thereof.

The invention is hereinafter described in its application to the bonding of shoe upper parts with laminated insoles, as in cement-lasting, but it is to be understood that the invention is of general application and is not limited to its application to the bonding of these particular parts.

The above and other features of the invention will be further explained in the following detailed description and defined in the claims.

In the drawing:

Fig. 1 is a schematic representation of a suitable machine for the practice of the invention, the sheet material under treatment being shown in section;

Fig. 2 is a plan view of the tread side of a laminated insole which has been prepared for bonding to an overlasted upper according to the method of the invention;

Fig. 3 is a fragmentary view on an enlarged scale showing in section a portion of a shoe embodying the insole shown in Fig. 2; and Fig. 4 is a sectional view on a greatly enlarged scale showing the result produced by the application of a step of the method of the invention to a piece of laminated sheet material having a plurality of laminae.

In the bonding together of an insole and an upper according to the method of the invention, an insole blank 2 is cut out of laminated sheet material having laminae 4 and 6, by any suitable means. This insole blank is then operated upon by a pair of coacting pressure rolls 8 and 10, the rolls being positively driven in opposite directions, as indicated by the arrows in Fig. 1. The upper pressure roll 8 has formed at spaced intervals about its periphery a series of protuberances 12. Although hemispherical protuberances have been shown in the drawing, it is obvious that protuberances of other shapes may be used. Depressions 14, having the same shape as the protuberances 12, are formed at spaced intervals about the periphery of the lower pressure roll 10. Advantageously, the depressions are considerably larger than the protuberances, thereby to avoid tearing the sheet material. The pressure rolls 8 and 10 are driven in timed relation so that the protuberances 12 and depressions cooperate to form protuberances 16 upon the surface 17 of an insole blank 2 passing between them, as shown in Fig. 1. The pressure rolls are so adjusted that a portion 18 of the lamina 4 is displaced to a position below the plane of the surface 17 of the lamina 6, while the surface of the lamina 6 is displaced accordingly, forming a protuberance upon the surface. It will be understood that the pressure rolls operate also to feed the insole blank 2 in the direction of the arrow in Fig. 1. This feeding action is utilized to carry the insole blank 2, upon which protuberances 16 have been formed, past a skiving knife 20 which operates to remove the protuberances 16 (and portions 18 of the lamina 4) from the insole blank 2. It will be understood that the protuberances may be removed by other means, as by grinding or the like.

The removal of the protuberances results in the production of an insole blank having areas 22 of the upper lamina 4 exposed in various areas over its surface 17. Preferably, the protuberances 16 are formed at a constant distance in from the edge of the insole blank 2 along a line extending around the toe thereof from the breast line to the breast line. This operation produces an insole such as that shown in Fig. 2 having areas 22 of one lamina 4 exposed upon the surface 17 of the second lamina 6, the areas 22 being so positioned that cement-receiving areas of both laminae will underlie the overlasted margin of an upper.

Such an insole may be used in the construction of a cement-lasted shoe, as indicated in Fig. 3. As shown, the insole 2, an upper 24 and a lining 26 are positioned upon a last 28. Preferably, the lining 26 is cut scant so that it barely extends over the edge of the insole 2. In the construction of the shoe, the insole is secured to the last in the usual manner with the areas 22 on the tread side of the insole. The upper parts are assembled upon the last 28 and adhesive is applied to the lasting margin of the upper 24 and along the margin of the insole 2, after which the upper is lasted over the insole in the usual manner. It will be understood that an adhesive bond is formed between the upper 24 and the lamina 4 throughout the area 22 as well as between the upper and the lamina 6. Thus, the fact that the bond between the upper 24 and the surface 17 of the insole 2 may be stronger than that between the laminae 4 and 6 is of little consequence since both of the laminae are bonded directly to the upper. Although the method has been described as applied to the bonding of an upper to a laminated insole, it is obvious that a similar advantage would be secured in the bonding of an upper to an insole of homogeneous material since the bond would extend not only to the surface of the insole but also to the subjacent stock.

Fig. 4 illustrates the application of the method of the invention to the preparation for bonding of a piece of laminated stock having a surface lamina 30 and a plurality of subjacent laminae 32. To produce the effect indicated in that figure a protuberance is formed on one surface of the laminated stock according to the method described above, the height of the protuberance being less than the thickness of the stock, and is removed by skiving, thereby to expose subjacent laminae. This operation results in the exposure upon the face of the surface lamina 30, of areas 34 of the laminae 32. Thus, when a second piece of sheet material 36 is coated with adhesive and pressed against the laminated material thus prepared, the adhesive bond will extend not only between the surface lamina 30 and the sheet material 36 but also between the sheet material 36 and each of the subjacent laminae 32, thereby greatly strengthening the bond between the two pieces of sheet material. It will be seen that material prepared for bonding according to the method of the invention has improved bonding characteristics which make it suitable for many uses. Although the invention has been described in its applications to the binding together of shoe parts and to the preparation of laminated sheet material for bonding, it may be used advantageously in the bonding together of any two pieces of sheet material.

Having thus described my invention, what I claim as new and desire to secure by Letters Patent of the United States is:

1. The method of bonding two pieces of sheet material which includes forming a plurality of protuberances on a surface of one of said pieces, removing said protuberances to expose subjacent stock in different areas over said surface, applying adhesive to at least the stock thus exposed, and bringing the piece together with a second piece of sheet material to which it is to be bonded, the area of said second piece being substantially greater than the total area of the subjacent stock thus exposed.

2. The method of bonding two pieces of sheet material one of which has protuberances upon its surface, which includes removing said protuberances to provide a flat surface in portions of which the subjacent stock is exposed, applying adhesive to the flat surface thus prepared including the subjacent stock, and bringing together the pieces to be bonded.

3. The method of bonding two pieces at least one of which is of laminated sheet material which includes forming a plurality of protuberances on the adhesive-receiving face of the laminated piece, the heights of said protuberances being less than the thickness of the material, removing said protuberances to expose successive subjacent laminae thereof in different areas over its surface, applying adhesive to at least the laminae thus exposed, and pressing the piece against the second piece the area of which is substantially greater than the total area of the subjacent laminae thus exposed.

4. That improvement in methods of cement-lasting shoes which includes the steps of preparing the margin of one of the shoe parts to be bonded by forming protuberances in the attaching surface thereof, removing said protuberances, applying adhesive both to the marginal surface and to the exposed portions of the subjacent material, and thereafter pressing the parts together to form adhesive bonds between the exposed subjacent material and the other shoe part.

5. The method of cement-lasting shoes to secure together an upper and an insole which includes forming a plurality of protuberances along the margin of one of said parts on its adhesive-receiving face, removing said protuberances to expose subjacent stock, applying adhesive to the margins of the upper and insole, lasting the upper, and pressing it against the insole, the adhesive bonds extending between the subjacent stock thus exposed and the other shoe part.

6. The method of cement-lasting shoes to secure together an upper and an insole which includes forming a plurality of protuberances along the margin of the insole, removing said protuberances to expose subjacent stock of the insole in different areas along its margin, applying adhesive to the stock thus exposed, to the margin of the insole, and to the lasting margin of the upper, lasting the upper over the insole, and pressing it against the insole, the adhesive bonds extending between the upper and at least the prepared areas of the insole.

7. The method of preparing a laminated insole for cement-lasting which includes forming a row of protuberances along its margin in position to underlie the overlasted margin of an upper, said protuberances extending from its tread side outwardly a distance less than the thickness of the material, and subsequently removing said protuberances to expose portions of subjacent laminae on the adhesive-receiving surface of said insole.

8. A laminated insole blank for cement-lasted shoes comprising an outer lamina having a row of openings disposed along the margin thereof in position to underlie the overlasted margins of an upper and at least one subjacent lamina, portions of which extend through the openings in said outer lamina and are exposed on the adhesive-receiving surface thereof.

ARTHUR L. RUSSELL.